United States Patent
Kang

(10) Patent No.: US 12,088,172 B2
(45) Date of Patent: Sep. 10, 2024

(54) MOTOR

(71) Applicant: LG INNOTEK CO., LTD., Seoul (KR)

(72) Inventor: Young Gu Kang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 799 days.

(21) Appl. No.: 17/271,759

(22) PCT Filed: Sep. 9, 2019

(86) PCT No.: PCT/KR2019/011649
§ 371 (c)(1),
(2) Date: Feb. 26, 2021

(87) PCT Pub. No.: WO2020/055067
PCT Pub. Date: Mar. 19, 2020

(65) Prior Publication Data
US 2021/0320557 A1    Oct. 14, 2021

(30) Foreign Application Priority Data

Sep. 12, 2018   (KR) .......................... 10-2018-0108994

(51) Int. Cl.
*H02K 5/22* (2006.01)
*H02K 5/10* (2006.01)

(52) U.S. Cl.
CPC ............... *H02K 5/225* (2013.01); *H02K 5/10* (2013.01); *H02K 2203/09* (2013.01)

(58) Field of Classification Search
CPC ............ H02K 5/225; H02K 5/26; H02K 5/22; H02K 2203/09; H02K 2203/12;
(Continued)

(56) References Cited

U.S. PATENT DOCUMENTS 10,050,493 B2   8/2018   Kabune
2007/0063596 A1*  3/2007   Akutsu .................. H02K 11/21
                                              310/68 B
(Continued)

FOREIGN PATENT DOCUMENTS

EP    2 741 405 A1   6/2014
JP    10-134898 A    5/1998
(Continued)

OTHER PUBLICATIONS

International Search Report dated Dec. 18, 2019 in International Application No. PCT/KR2019/011649.
(Continued)

*Primary Examiner* — Nguyen Tran
(74) *Attorney, Agent, or Firm* — Saliwanchik, Lloyd & Eisenschenk

(57) ABSTRACT

An embodiment relates to a motor comprising: a shaft; a rotor coupled to the shaft; a stator disposed outside the rotor; a housing for accommodating the rotor and the stator; a cover arranged above the housing; a circuit board arranged under the cover; and a connector electrically connected to the circuit board, wherein the cover comprises a cover body and a cover protrusion protruding from a lower portion of the cover body in an axial direction, the connector comprises a connector body and a grommet disposed at a side of the connector body, and the connector is fitted into a groove formed in the cover protrusion by using the grommet. Accordingly, the motor can be movably arranged on the cover.

18 Claims, 9 Drawing Sheets

(58) Field of Classification Search
CPC ........ H02K 2203/15; H02K 5/10; H02K 5/02; H02K 5/04; H02K 5/08
See application file for complete search history.

(56) References Cited

U.S. PATENT DOCUMENTS

| | | |
|---|---|---|
| 2015/0145359 A1 | 5/2015 | Okada et al. |
| 2015/0275894 A1* | 10/2015 | Tabata ................ F04C 18/3446 |
| | | 417/410.3 |
| 2016/0036296 A1 | 2/2016 | Kabune |
| 2016/0352180 A1* | 12/2016 | Shen .................... H02K 5/1672 |

FOREIGN PATENT DOCUMENTS

| | | |
|---|---|---|
| JP | 2007-181284 A | 7/2007 |
| JP | 2009-284679 A | 12/2009 |
| JP | 2014-110697 A | 6/2014 |
| JP | 2018-27005 A | 2/2018 |
| KR | 10-2018-0080537 A | 7/2018 |
| KR | 10-2018-0092423 A | 8/2018 |

OTHER PUBLICATIONS

Office Action dated Apr. 24, 2023 in Chinese Application No. 201980059440.5.
Office Action dated Jul. 4, 2023 in Japanese Application No. 2021-513913.
Supplementary European Search Report dated May 2, 2022 in European Application No. 19859239.6.

* cited by examiner

MOTOR

CROSS-REFERENCE TO RELATED APPLICATIONS

This application is the U.S. national stage application of International Patent Application No. PCT/KR2019/011649, filed Sep. 9, 2019, which claims the benefit under 35 U.S.C. § 119 of Korean Application No. 10-2018-0108994, filed Sep. 12, 2018, the disclosures of each of which are incorporated herein by reference in their entirety.

TECHNICAL FIELD

The present invention relates to a motor.

BACKGROUND ART

Motors are apparatuses configured to convert electrical energy to mechanical energy to obtain rotational forces and are widely used for vehicles, home appliances, industrial machines, and the like.

Particularly, as more electric devices are used in a vehicle, demands for a motor applied to a steering system, a braking system, a machinery system, and the like are significantly increasing. For example, an electronic power steering (EPS) system, in which the motor is used, secures turning stability and provides a rapid restoring force using an electronic control unit (ECU) configured to control driving of the motor according to operating conditions. Accordingly, a driver of the vehicle can travel safely.

The motor may include a housing, a shaft, a stator disposed on an inner circumferential surface of the housing, a rotor installed on an outer circumferential surface of the shaft, and the like. In this case, an electrical interaction may be induced between the stator and the rotor so that the rotor may rotate.

In addition, although the motor may include a connector, which is coupled to a connector of an ECU of the vehicle, and a power terminal, when a gap is not present at a side of the connector, there is a problem in that the connector is damaged in a process in which the connector is coupled to the connector of the ECU of the vehicle.

Accordingly, an additional process of assembling the connector to form the gap is required in order to solve such a problem, and thus there is a problem in that the productivity of the motor decreases due to the additional process.

Technical Problem

The present invention is directed to providing a motor including a connector movably disposed on a cover to be coupled to an electronic control unit of a vehicle without damage. For example, a motor is provided which has a coupling structure of a connector and a cover so that movability is secured.

Objectives to be solved by the present invention are not limited to the above-described objectives, and other objectives which are not described above will be clearly understood by those skilled in the art from the following specification.

Technical Solution

One aspect of the present invention provides a motor including a shaft, a rotor coupled to the shaft, a stator disposed outside the rotor, a housing in which the rotor and the stator are accommodated, a cover disposed on the housing, a circuit board disposed under the cover, and a connector electrically connected to the circuit board, wherein the cover includes a cover body and a cover protrusion protruding from a lower portion of the cover body in a shaft direction, the connector includes a connector body and a grommet disposed at one side of the connector body, and the connector is coupled to a groove formed in the cover protrusion using the grommet through a press-fitting method.

The connector may further include first protrusions protruding from two side surfaces of the connector body, wherein the first protrusions may be coupled to grooves formed in the grommet.

The grommet may be formed of a rubber material.

The connector may further include a pair of second protrusions spaced apart from each other and protruding from an upper surface of the connector body in the shaft direction, wherein the grommet may be disposed between the second protrusions.

The connector may further include a third protrusion protruding from a lower surface of the connector body in the shaft direction, wherein the third protrusion may be coupled to a groove formed in the housing.

The cover protrusion may include a cut portion formed by cutting one region of the cover protrusion.

The circuit board may be fixed to a lower portion of the cover by a fixing member, and the circuit board and the connector may be electrically connected by an electric wire. In this case, the cover may include a protruding portion formed to protrude from a lower surface of the cover, wherein the circuit board may be fixed to the protruding portion.

The grommet may be disposed on the connector body through a double-injection method.

Advantageous Effects

According to embodiments, since a motor includes a connector movably disposed on a cover, the motor can be coupled to a connector of an electronic control unit (ECU) of a vehicle without damage.

In addition, the movability of the connector coupled to the cover can be secured using a grommet which is formed of a rubber material and disposed on the connector. In this case, since one inner region of the connector is coupled to the cover, the movability of the connector can be further secured.

In addition, a cover protrusion formed to protrude from a lower portion of the cover can be used to guide coupling of the connector and also secure the movability of the connector.

Various and useful advantages and effects are not limited to the above-described contents and will be more easily understood while specific embodiments are described.

MODES OF THE INVENTION

Figure 1:
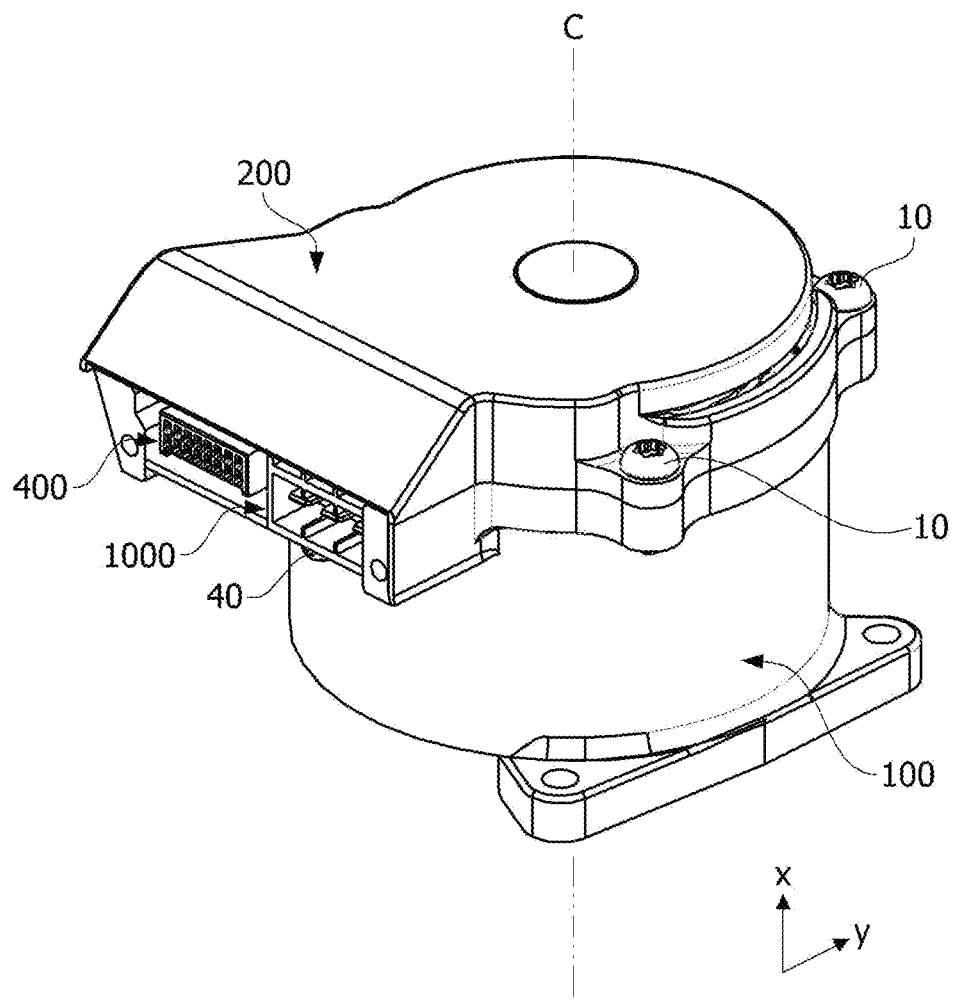
FIG. 1 is a perspective view illustrating a motor according to an embodiment.

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present invention are considered in a descriptive sense and not for limiting the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both of a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Hereinafter, example embodiments of the invention will be described in detail with reference to the accompanying drawings. Components that are the same or correspond to each other will be denoted by the same reference numerals regardless of the figure numbers, and redundant descriptions will be omitted.

Figure 2:
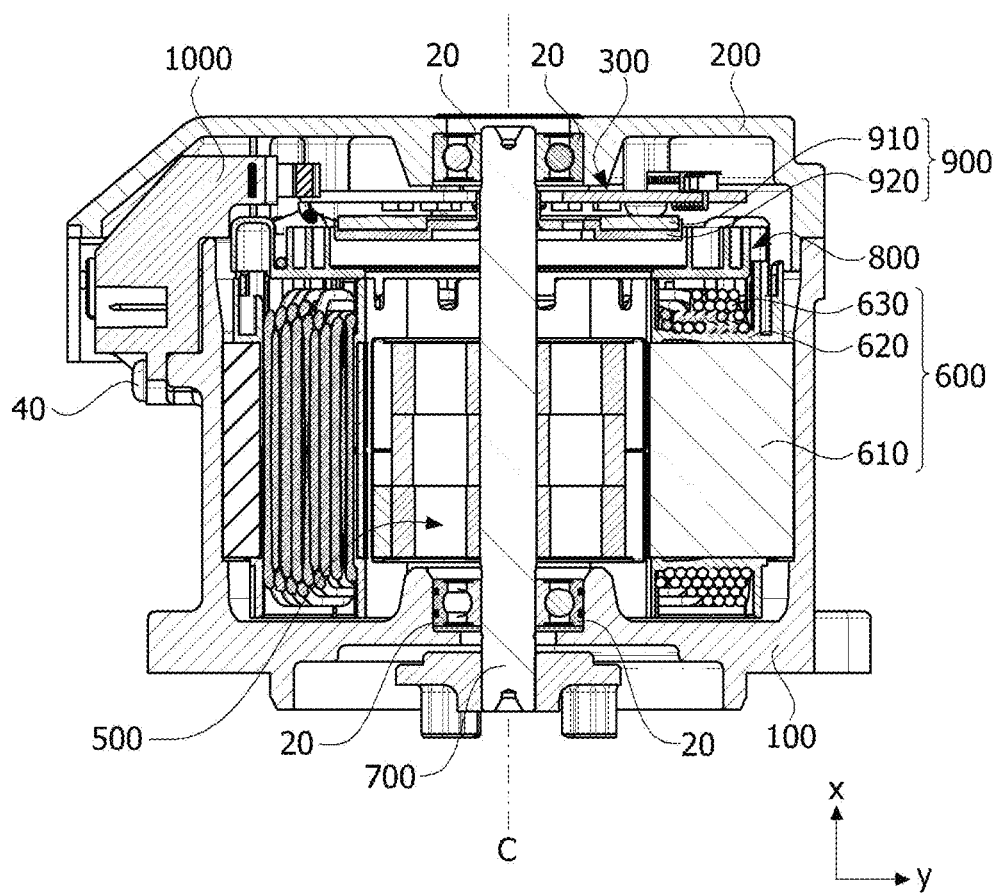
FIG. 2 is a cross-sectional view illustrating the motor according to the embodiment.
Figure 3:
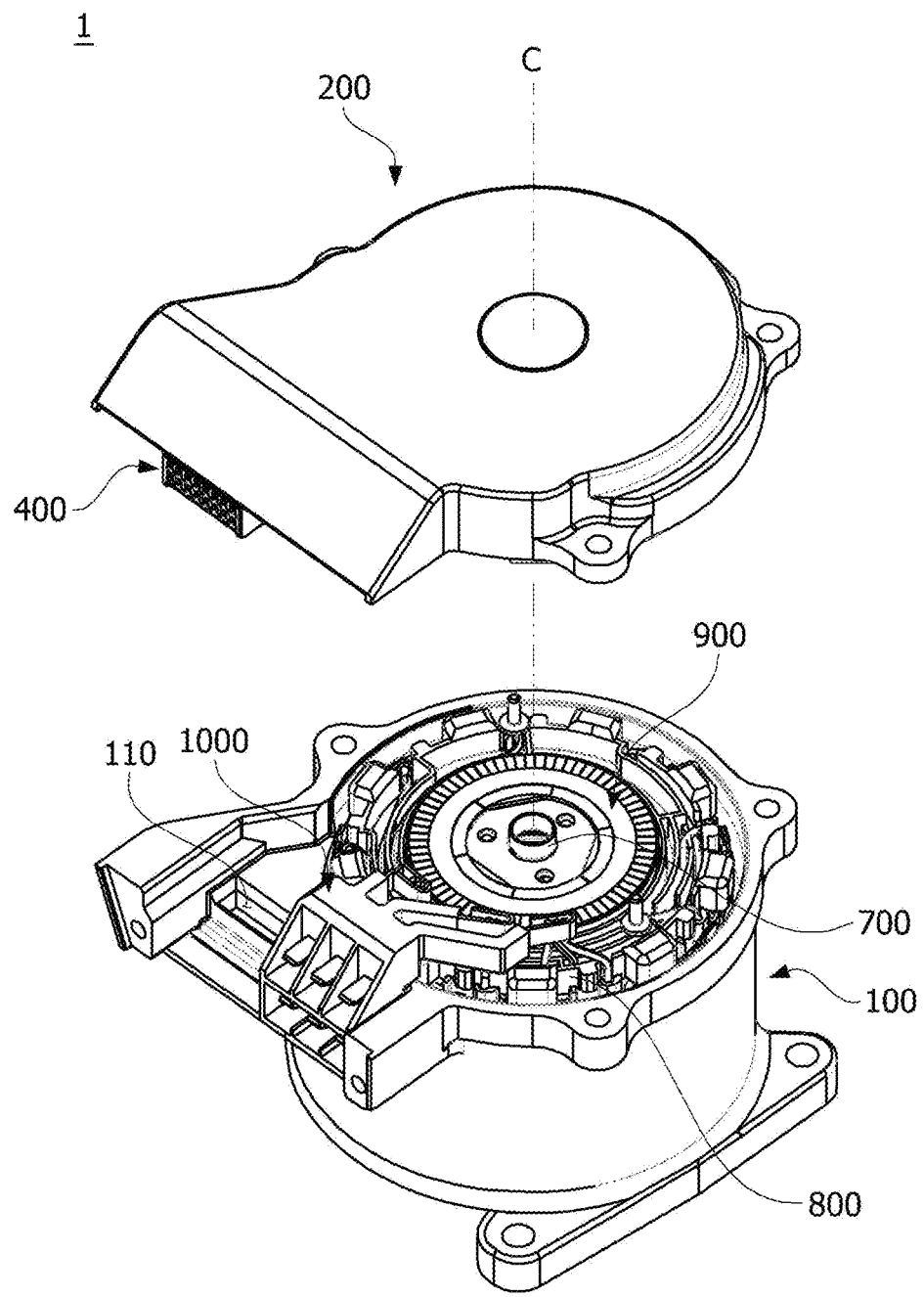
FIG. 3 is an exploded perspective view illustrating a coupling relationship between a housing and a cover, on which a connector is disposed, of the motor according to the embodiment.

FIG. 1 is a perspective view illustrating a motor according to an embodiment, FIG. 2 is a cross-sectional view illustrating the motor according to the embodiment, and FIG. 3 is an exploded perspective view illustrating a coupling relationship between a housing and a cover, on which a connector is disposed, of the motor according to the embodiment. In FIG. 1, an x direction may be referred to as a shaft direction, and a y direction may be referred to as a radial direction. In addition, the shaft direction may be perpendicular to the radial direction.

Referring to FIGS. 1 to 3, a motor 1 according to the embodiment may include a housing 100 in which an opening is formed at one side thereof, a cover 200 disposed on the housing 100, a circuit board 300 disposed under the cover 200, a connector 400 electrically connected to the circuit board 300, a rotor 500 coupled to a shaft 700, a stator 600 disposed in the housing 100, the shaft 700 configured to rotate with the rotor 500, a busbar 800 disposed above the stator 600, a sensing magnet assembly 900 coupled to the shaft 700, and a power terminal 1000 fixed to the housing 100.

The rotor 500 and the stator 600 may be accommodated in the housing 100. In addition, the connector 400 may be coupled to the cover 200 to secure movability. In this case, the connector 400 may be referred to as a sensor connector. In addition, the power terminal 1000 may be referred to as a power connector.

When a connector (not shown) of an electronic control unit (ECU) of a vehicle is coupled to the connector 400 and the power terminal 1000, the power terminal 1000 fixed to the housing 100 may provide a coupling position.

When the connector 400 is fixed to the cover 200 without movability, and the connector (not shown) of the ECU of the vehicle is coupled to the connector 400 and the power terminal 1000, the connector 400 and the like may be damaged. For example, when the connector 400 is fixedly installed on the cover 200 like the power terminal 1000 fixed to the housing 100, a deviation may occur at an assembly position of the connector 400 and the power terminal 1000 due to assembly tolerances. In addition, a load applied to the connector of the ECU due to the deviation may damage the connector 400 and the power terminal 1000.

Accordingly, in the motor 1, a coupling structure in which movability is secured between the cover 200 and the connector 400 is used to easily connect the connector of the ECU to the connector 400 and the power terminal 1000 without damage. For example, even when the power terminal 1000 is fixed to the housing 100, since the connector 400 is movably disposed on the cover 200, the connector 400 and the power terminal 1000 may be inhibited from being damaged due to the movability even when the deviation occurs.

In this case, the motor 1 may be used in an electronic power steering (EPS) system.

The housing 100 and the cover 200 may form an exterior of the motor 1. The housing 100 may be coupled to the cover 200 using first fixing members 10 such as bolts. In addition, an accommodation space may be formed in the motor 1 by coupling the housing 100 and the cover 200. Accordingly, as illustrated in FIG. 2, the circuit board 300, the connector 400, the rotor 500, the stator 600, the shaft 700, the busbar 800, the sensing magnet assembly 900, and the like may be disposed in the accommodation space. In this case, the shaft 700 may be rotatably disposed in the accommodation space.

In addition, the motor 1 may include bearings 20 disposed on upper and lower portions of the shaft 700.

The housing 100 may be formed in a cylindrical shape. In addition, the rotor 500, the stator 600, and the like may be accommodated in the housing 100. In this case, the shape or a material of the housing 100 may be variously changed. For example, the housing 100 may be formed of a metal material which firmly withstands even high temperatures.

The cover 200 may be disposed on an open surface of the housing 100, that is, an upper portion of the housing 100, to cover an opening of the housing 100.

Figure 4:
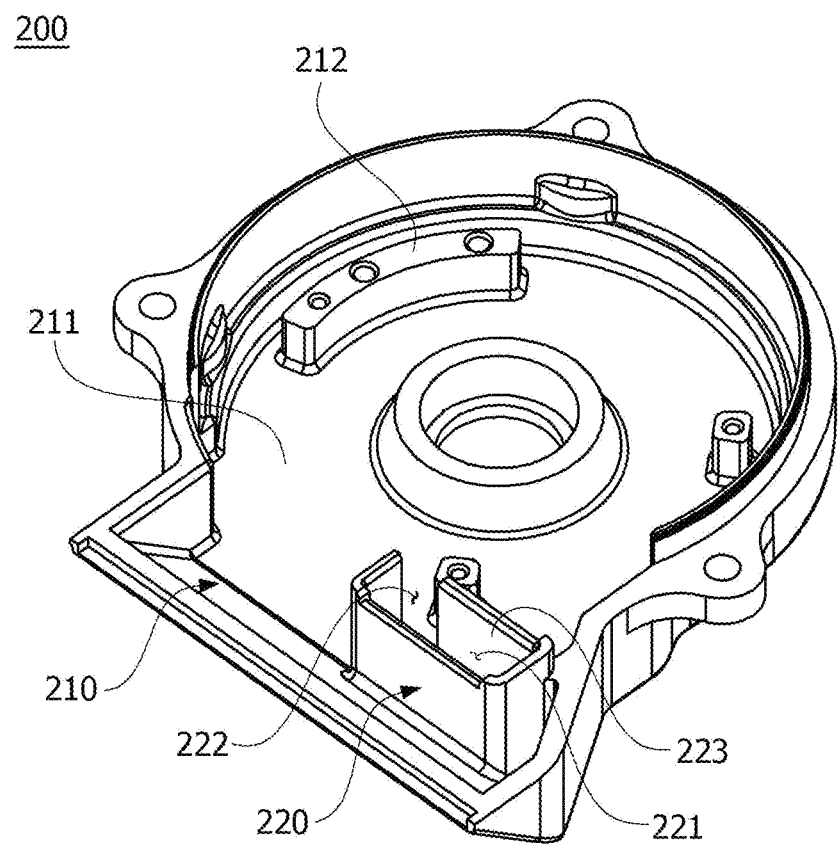
FIG. 4 is a bottom perspective view illustrating the cover of the motor according to the embodiment.

FIG. 4 is a bottom perspective view illustrating the cover of the motor according to the embodiment.

Referring to FIG. 4, the cover 200 may include a cover body 210 and a cover protrusion 220 protruding from a lower portion of the cover body 210 in the shaft direction. In this case, the cover body 210 and the cover protrusion 220 may be integrally formed.

The cover body 210 may be disposed on the housing 100 to cover the opening of the housing 100. In addition, the circuit board 300 may be disposed under the cover body 210.

The cover protrusion 220 may guide coupling of the cover 200 and the connector 400.

The cover protrusion 220 may be formed in a container shape in which a groove 221 is formed. Accordingly, one portion of the connector 400 may be disposed in the groove 221. In this case, the connector 400 may be coupled to the cover protrusion 220 through a press-fitting method.

In this case, since the cover protrusion 220 is formed to have a predetermined height, even when a load is applied to the connector 400 in the radial direction, the cover protrusion 220 allows the connector 400 to have movability in the radial direction.

In addition, when the cover protrusion 220 is formed in the container shape, since the cover protrusion 220 may be formed of a synthetic resin material to have a predetermined thickness, an elastic force may be secured. Accordingly, the cover protrusion 220 may guide the connector 400 to be easily coupled thereto through the press-fitting method.

Meanwhile, one portion of the cover protrusion 220 may be cut. Accordingly, as illustrated in FIG. 4, a cut portion 222 which is cut in the shaft direction may be formed at one side of the cover protrusion 220.

When the cover protrusion 220 and the connector 400 are coupled, the cut portion 222 allows the cover protrusion 220 to elastically support one side of the connector 400. For example, when the connector 400 is coupled to the cover protrusion 220 through the press-fitting method, an inner side surface 223 of the cover protrusion 220 may be pressed against the connector 400 due to the cut portion 222. In this case, the cover protrusion 220, of which an elastic force is secured due to the cut portion 222, may be inhibited from being damaged.

That is, the cut portion 222 may provide the elastic force to be coupled with the connector 400 through the press-fitting method. In addition, the cut portion 222 may inhibit the cover protrusion 220 from being damaged and provide movability for the connector 400.

The circuit board 300 may detect a magnetic force of a sensing magnet 910 of the sensing magnet assembly 900. In addition, the circuit board 300 may be provided as a printed circuit board (PCB) on which sensors 310 configured to detect the magnet force of the sensing magnet 910 are mounted.

In this case, the sensor 310 may be provided as a Hall integrated circuit (IC). In addition, the sensor 310 may detect a change in an N-pole and a P-pole of the sensing magnet 910 to generate a sensing signal.

Figure 5:
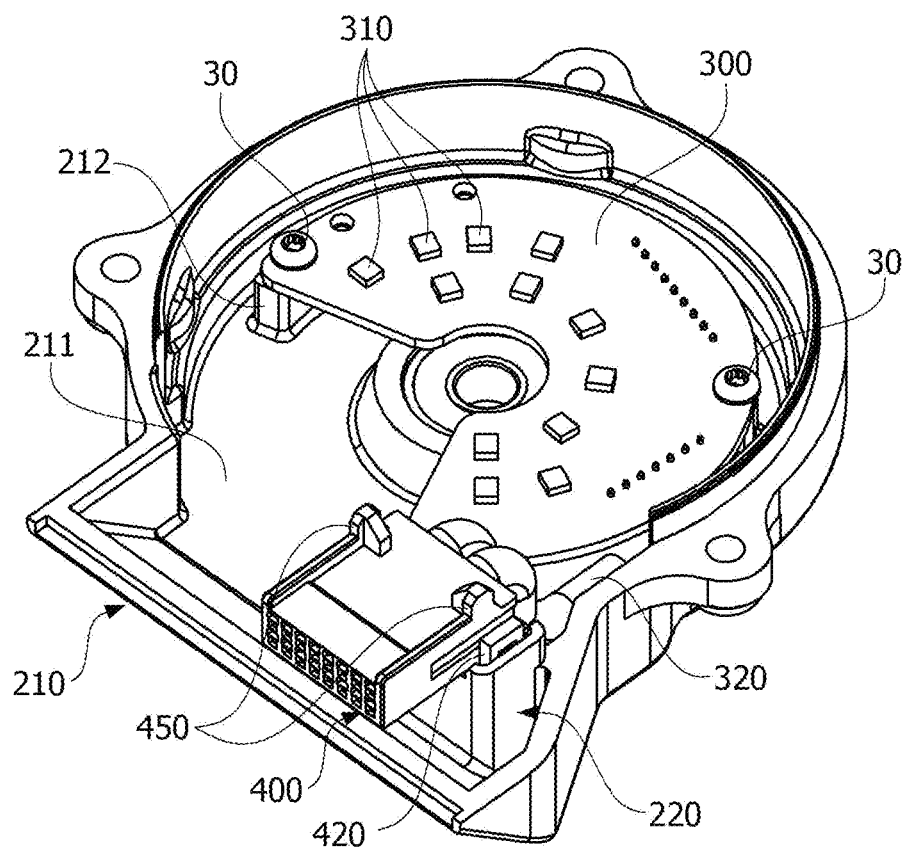
FIGS. 5 and 6 are views illustrating an arrangement of a circuit board and the connector which are disposed on the cover of the motor according to the embodiment.
Figure 6:
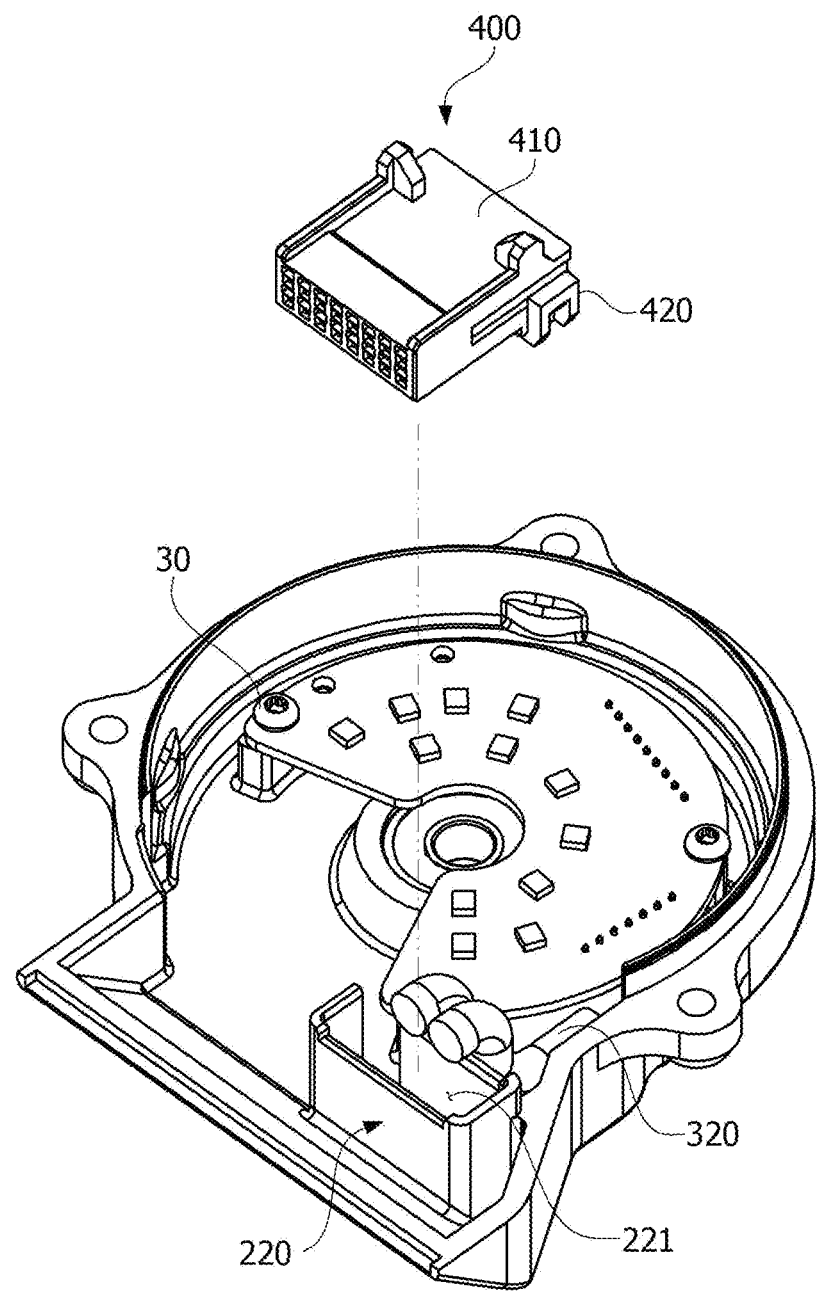

FIGS. 5 and 6 are views illustrating an arrangement of the circuit board and the connector which are disposed on the cover of the motor according to the embodiment.

Referring to FIGS. 5 and 6, the circuit board 300 may be disposed under the cover 200.

In this case, the circuit board 300 may be disposed on a protruding portion 212 formed to protrude from a lower surface 211 of the cover 200. In addition, the circuit board 300 may be fixed to the protruding portion 212 by second fixing members 30. In this case, a protruding height of the protruding portion 212 may be formed in consideration of a coupling position of the circuit board 300 and the connector 400.

In addition, as illustrated in FIGS. 5 and 6, the circuit board 300 and the connector 400 may be electrically connected by an electric wire 320 disposed at one side of the circuit board 300.

Figure 7:
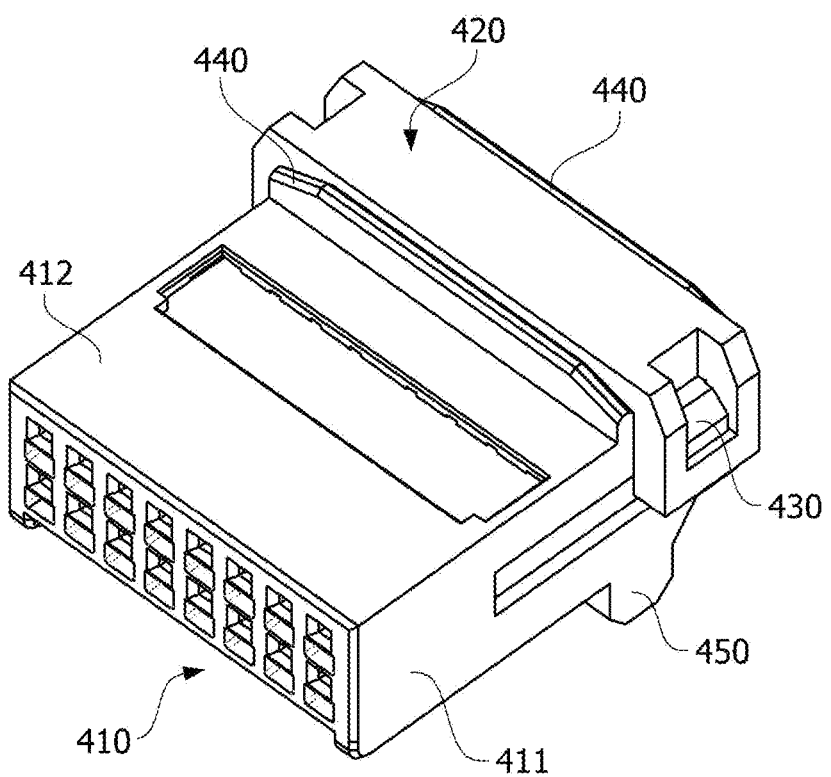
FIG. 7 is a perspective view illustrating the connector of the motor according to the embodiment.
Figure 8:
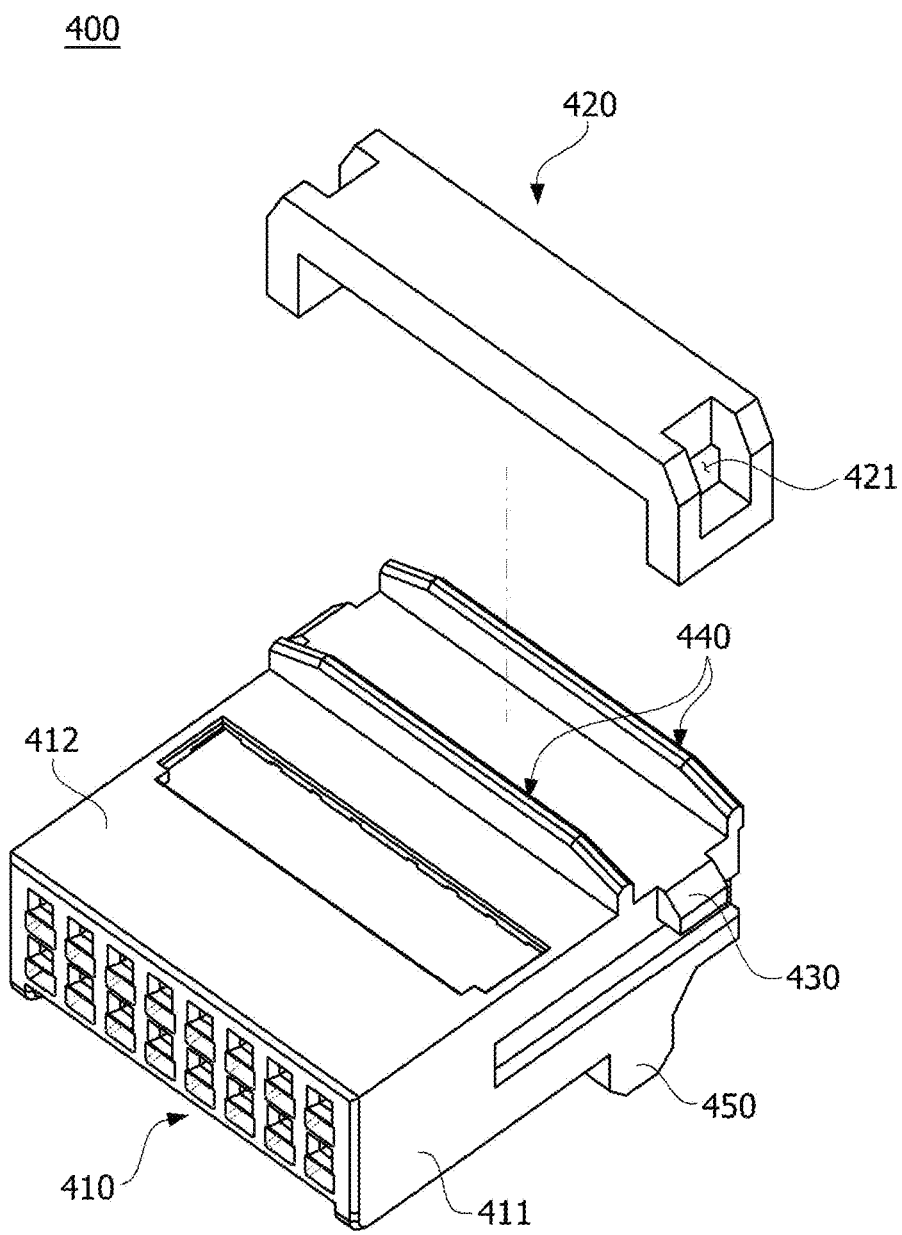
FIG. 8 is an exploded perspective view illustrating the connector of the motor according to the embodiment.
Figure 9:
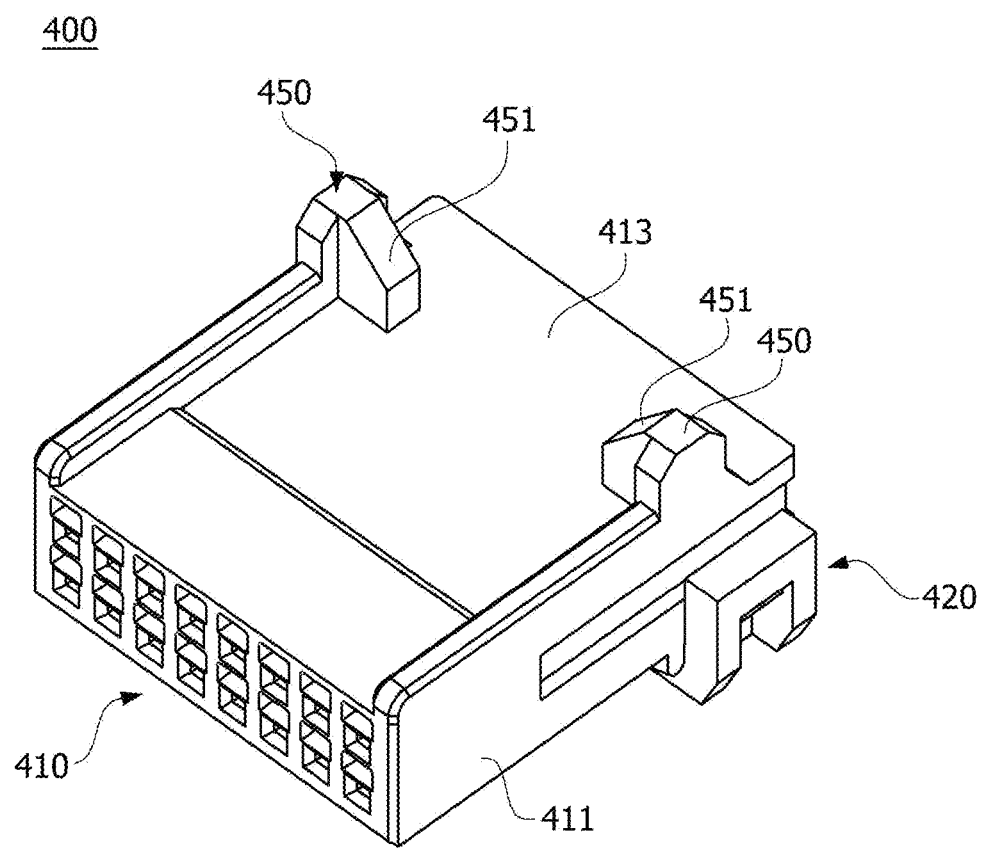
FIG. 9 is a bottom perspective view illustrating the connector of the motor according to the embodiment.

FIG. 7 is a perspective view illustrating the connector of the motor according to the embodiment, FIG. 8 is an exploded perspective view illustrating the connector of the motor according to the embodiment, and FIG. 9 is a bottom perspective view illustrating the connector of the motor according to the embodiment.

Referring to FIGS. 7 to 9, the connector 400 may include a connector body 410 and a grommet 420 disposed on the connector body 410. In addition, the connector 400 may include first protrusions 430 protruding from two side surfaces 411 of the connector body 410 in width directions, a pair of second protrusions 440 spaced apart from each other and protruding from an upper surface 412 of the connector body 410 in the shaft direction, and third protrusions 450 protruding from a lower surface 413 of the connector body 410 in the shaft direction. In this case, the connector body 410, the first protrusions 430, the second protrusions 440, and the third protrusions 450 may be integrally formed. In this case, the width direction may be a direction perpendicular to the radial direction when viewed from above.

The connector body 410 may be coupled to the connector of the ECU to be electrically connected to the connector of the ECU. In this case, a terminal may be disposed in the connector body 410. In this case, one side of the terminal may be electrically connected to the electric wire 320.

The grommet 420 may be disposed on the connector body 410. As illustrated in FIG. 5, the grommet 420 coupled to the connector body 410 is disposed in the cover protrusion 220 to allow the connector 400 to have movability.

Referring to FIG. 8, grooves 421 may be formed in the grommet 420. In addition, as illustrated in FIG. 7, the first protrusions 430 may be coupled to the grooves 421.

Meanwhile, the grommet 420 may be formed of a rubber material having an elastic force. Accordingly, movability of the connector 400 coupled to the cover protrusion 220 may be secured due to the elastic force of the grommet 420.

The first protrusions 430 may protrude from one side surface and the other side surface of the connector body 410 in the width directions. In addition, the first protrusions 430 may be coupled to the grooves 421 of the grommet 420. Accordingly, the grommet 420 may be fixed to the connector body 410.

In this case, an example in which the grommet 420 is disposed on the connector body 410 by coupling the first protrusions 430 and the grooves 421 of the grommet 420 is described, but the present invention is not necessarily limited thereto. For example, the grommet 420 may also be disposed on the connector body 410 through a double-injection method. The second protrusions 440 guide the grommet 420 to be coupled to the connector body 410. In addition, the second protrusions 440 support the grommet 420 to inhibit the grommet 420 from moving in the radial direction.

The second protrusions 440 may protrude from the upper surface 412 of the connector body 410 in the shaft direction. In this case, the second protrusions 440 may be disposed to be spaced apart from each other by a predetermined distance in the radial direction. Accordingly, the grommet 420 may be disposed between the second protrusions 440.

Accordingly, in the state in which the grommet 420 is disposed between the second protrusions 440, the second protrusions 440 may be coupled to the cover protrusion 220.

The third protrusions 450 may be formed to protrude from the lower surface 413 of the connector body 410 in the shaft direction.

In addition, the third protrusions 450 may be coupled to a groove 110 formed in the housing 100. In this case, in a state in which the connector 400 is temporarily assembled to the cover 200 first, the connector 400 may be coupled to the housing 100 using the third protrusions 450 coupled to the groove 110 of the housing 100.

Referring to FIG. 9, a pair of third protrusions 450 may be formed on the lower surface 413 of the connector body 410 to face each other and to be spaced apart from each other. In this case, ribs 451 may be formed on the third protrusions 450 to improve strength of the third protrusions 450.

In this case, an example in which the pair of third protrusions 450 are formed is described, but the present invention is not necessarily limited thereto. For example, the third protrusions 450 may be formed in one protrusion form. However, in the case in which the pair of third protrusions 450 are formed, material may be conserved when compared to the case in which the third protrusions 450 are formed in one protrusion form. However, the rib 451 may be disposed on the third protrusion 450 to secure strength thereof.

Accordingly, in the state in which the connector body 410 is coupled to the grommet 420, since an upper portion of the connector body 410 is coupled to the cover protrusion 220, and a lower portion, that is the third protrusions 450, of the connector body is coupled to the groove 110 formed in the housing 100, a position of the connector 400 is determined in the motor 1 in the shaft direction and in the radial direction.

In this case, since the grommet 420 of the connector 400 is formed of a material having an elastic force, the connector 400 may secure movability.

In addition, since the connector 400 is coupled to the cover protrusion 220 having the predetermined height, even when a weight is applied to the connector 400 in the radial direction, the connector 400 may be more easily matched with the load.

In addition, since one inner region of the connector 400 is coupled to the cover protrusion 220, the connector 400 may tilt vertically. Accordingly, movability of the connector 400 may be further improved.

Referring to FIG. 2, the rotor 500 may be disposed inside the stator 600, and the shaft 700 may be coupled to a central portion of the rotor 500 through a press-fitting method. In this case, the term "inside" may be referred to as a direction toward a center C, and the term "outside" may be referred to as a direction opposite to the term "inside."

In addition, the rotor 500 may be rotatably disposed inside the stator 600.

Referring to FIG. 2, the rotor 500 may include a rotor core (not shown) and a plurality of magnets (not shown) disposed on an outer circumferential surface of the rotor core in a circumferential direction. In this case, the magnets may be referred to as rotor magnets or drive magnets.

In this case, an example in which the plurality of magnets are disposed on the outer circumferential surface of the rotor core in the rotor 500 is described, but the present invention is not necessarily limited thereto. For example, the rotor 500 may also be formed as an interior permanent magnet (IPM) type rotor in which magnets are disposed in a rotor core.

The rotor core may be formed in a form, in which a plurality of circular thin steel plates are stacked on each other, or a single cylindrical form. In addition, a hole coupled to the shaft 700 may be formed at a center of the rotor core.

The magnets generate a rotating magnetic field with coils 630 wound around the stator core 610 of the stator 600. The magnets may be disposed so that an N-pole and an S-pole are alternately disposed around the shaft 700 in the circumferential direction.

Accordingly, due to an electrical interaction between the coils 630 and the magnets of the rotor 500, the rotor 500 is rotated, and the shaft 700 is rotated in conjunction with the rotation of the rotor 500 so that a driving force of the motor 1 is generated.

Meanwhile, the rotor 500 may further include a can (not shown) disposed to cover the rotor core to which the magnets are attached.

The can may protect the rotor core and the magnets from external shocks and physical and chemical stimuli while inhibiting foreign materials from being introduced to the rotor core and the magnets.

In addition, the can inhibits the magnets from being separated from the rotor core.

The stator 600 may be disposed inside the housing 100. In this case, the stator 600 may be coupled to the housing 100 through a hot press-fitting method. Accordingly, the stator 600 may be supported by an inner circumferential surface of the housing 100. In addition, the stator 600 is disposed outside the rotor 500. That is, the rotor 500 may be rotatably disposed inside the stator 600.

Referring to FIG. 2, the stator 600 may include the stator core 610, insulators 620 disposed on the stator core 610, and the coils 630 wound around the insulators 620. In this case, the insulators 620 may be disposed between the stator core 610 and the coils 630 to insulate the coils 630 from the stator core 610.

The coils 630 configured to generate a rotating magnetic field may be wound around the stator core 610.

The stator core 610 may be formed as one single product or a plurality of divided cores that are coupled.

The stator core 610 may be formed in a form in which a plurality of thin steel plates are stacked on each other, but the present invention is not necessarily limited thereto. For example, the stator core 610 may also be formed as one single product.

The stator core 610 may include a yoke and a plurality of teeth protruding from the yoke in the radial direction. In addition, the coil 630 may be wound around the tooth. In this case, the insulator 620 may be disposed between the tooth and the coil 630 to insulate the coil 630 from the tooth.

The insulator 620 may be formed of a synthetic resin material to insulate the stator core 610 from the coil 630. In addition, the coil 630 may be wound around the stator core 610 on which the insulator 620 is disposed.

The insulators 620 may be coupled to an upper side and a lower side of the stator core 610. In this case, the insulators 620 may also be formed as one single product to be coupled to the stator core 610. Alternatively, a plurality of unit insulators may also be formed as the insulators 620 so that the insulators 620 are disposed on the stator core 610 in the circumferential direction.

As illustrated in FIG. 2, the shaft 700 may be rotatably supported by the bearings 20 in the housing 100. In addition, the shaft 700 may be rotated in conjunction with the rotation of the rotor 500.

The busbar 800 may be disposed on the stator 600.

In addition, the busbar 800 may be electrically connected to the coil 630 of the stator 600. In addition, the busbar 800 may be electrically connected to the power terminal 1000.

The busbar 800 may include a busbar body and a plurality of terminals disposed in the busbar body. In this case, the busbar body may be a mold product formed through an injection molding process. In addition, the terminals may be electrically connected to the coils 630 of the stator 600. In this case, some of the coils 630 may be electrically connected to the power terminal 1000 or may also be connected to the power terminal 1000 using the terminals.

The sensing magnet assembly 900 may be coupled to the shaft 700 to rotate in conjunction with the rotor 500. Accordingly, the sensing magnet assembly 900 detects a position of the rotor 500. In this case, the sensing magnet assembly 900 may include sensing magnets 910 and a sensing plate 920. In this case, the sensing magnets 910 and the sensing plate 920 may be coaxially coupled.

The sensing magnets 910 may include main magnets disposed close to a hole of the sensing plate 920 forming an inner circumferential surface thereof in the circumferential direction and sub-magnets formed on an edge thereof. The main magnets may be arranged like the drive magnets inserted into the rotor 500 of the motor. In addition, the sub-magnets may be divided further than the main magnets so that the sub-magnets may be formed to have poles of which the number is greater than the number of poles of the main magnets. Accordingly, a rotation angle may be divided and measured more precisely, and thus the motor may be driven more smoothly.

The sensing plate 920 may be formed of a metal material having a disc shape. The sensing magnet 910 may be coupled to an upper surface of the sensing plate 920. In addition, the sensing plate 920 may be coupled to the shaft 700. In this case, a hole through which the shaft 700 passes may be formed in the sensing plate 920.

The power terminal 1000 may be electrically connected to the busbar 800 and disposed in the housing 100.

As illustrated in FIG. 1, the power terminal 1000 may be disposed between the housing 100 and the cover 200. In this case, one side of the power terminal 1000 may be exposed to the outside to be coupled to the connecter of the ECU.

Referring to FIG. 1, the power terminal 1000 may be fixed to one side of the housing 100 by a third fixing member 40. Accordingly, the power terminal 1000 may be provided as a reference of a coupling position when coupled with the connector of the ECU.

Accordingly, in a state in which the position of the power terminal 1000 is fixed, the motor 1 may secure movability of the connector 400. Accordingly, when the connector of the ECU is coupled to the power terminal 1000 and the connector 400, direct connection may be allowed without damage. In this case, the connector of the ECU may be provided as a single component connected to both of the power terminal 1000 and the connector 400.

While the present invention has been described with reference to the exemplary embodiments thereof, it will be understood by those skilled in the art that various changes in form and details may be made therein without departing from the spirit and scope of the invention as defined by the appended claims.

| REFERENCE NUMERALS | |
|---|---|
| 1: MOTOR | 100: HOUSING |
| 200: COVER | 300: CIRCUIT BOARD |
| 400: CONNECTOR | 500: ROTOR |
| 600: STATOR | 700: SHAFT |
| 800: BUSBAR | 900: SENSING MAGNET ASSEMBLY |
| 1000: POWER TERMINAL | |

The invention claimed is:

1. A motor comprising:
a shaft;
a rotor coupled to the shaft;
a stator disposed outside the rotor;
a housing in which the rotor and the stator are accommodated;
a cover disposed on the housing;
a circuit board disposed under the cover; and
a connector electrically connected to the circuit board,
wherein the cover includes a cover body and a cover protrusion protruding from a lower portion of the cover body in a shaft direction,
wherein the connector includes a connector body with one side exposed to outside and a grommet disposed at another side of the connector body, and
wherein the connector body is disposed on the cover protrusion to be tiltable in an axial direction through the grommet coupled with a groove formed in the cover protrusion.

2. The motor of claim 1, wherein the connector includes first protrusions protruding from two side surfaces of the connector body, and
wherein the first protrusions are coupled to grooves formed in the grommet.

3. The motor of claim 2, wherein the grommet is formed of a rubber material.

4. The motor of claim 3, wherein the connector includes a pair of second protrusions spaced apart from each other and protruding from an upper surface of the connector body in the shaft direction, and
wherein the grommet is disposed between the second protrusions.

5. The motor of claim 4, wherein the connector includes a third protrusion protruding from a lower surface of the connector body in the shaft direction, and
wherein the third protrusion is coupled to a groove formed in the housing.

6. The motor of claim 1, wherein the cover protrusion includes a cut portion formed by cutting one region of the cover protrusion.

7. The motor of claim 1, comprising a power terminal disposed on the housing,
wherein the power terminal is fixed to the housing by a fixing member.

8. The motor of claim 1, wherein:
the circuit board is fixed to a lower portion of the cover by a fixing member; and
the circuit board and the connector are electrically connected by an electric wire.

9. The motor of claim 8, wherein the cover includes a protruding portion formed to protrude from a lower surface of the cover, and wherein the circuit board is fixed to the protruding portion.

10. The motor of claim 3, wherein the grommet is disposed on the connector body through a double-injection method.

11. The motor of claim 3, wherein the grommet is disposed inside an upper surface of the connector body.

12. The motor of claim 5, wherein the third protrusion is disposed to overlap the grommet in the shaft direction.

13. The motor of claim 7, wherein, when the cover to which the connector is coupled and the housing to which the power terminal is fixed are coupled, a deviation occurs at an assembly position of the connector and the power terminal.

14. The motor of claim 7, comprising a busbar disposed above the stator, wherein the power terminal is electrically connected to the busbar.

15. The motor of claim 14, wherein the connector and the power terminal are disposed to be in parallel in a width direction.

16. The motor of claim 15, wherein a connector of an electronic control unit (ECU) is provided as a single component connected to both of the power terminal and the connector.

17. The motor of claim 7, wherein some of coils of the stator are electrically connected to the power terminal.

18. The motor of claim 14, wherein some of coils of the stator are electrically connected to the power terminal.

* * * * *